United States Patent [19]

York

[11] 3,739,958
[45] June 19, 1973

[54] NON-RETURN VALVE FOR INJECTION MOLDING MACHINE

[75] Inventor: Raymond A. York, Chester Springs, Pa.

[73] Assignee: Beloit Corporation, Beloit, Wis.

[22] Filed: Dec. 10, 1971

[21] Appl. No.: 206,805

[52] U.S. Cl. .............................. 222/404, 222/413
[51] Int. Cl. ........................................ G01f 11/20
[58] Field of Search .................. 222/413, 412, 411, 222/320, 404; 259/191–193

[56] References Cited
UNITED STATES PATENTS 3,486,664  12/1969  Loomans ........................... 222/413
3,335,461  8/1967  Schwartz ........................ 222/413 X Primary Examiner—Samuel F. Coleman
Assistant Examiner—John P. Shannon
Attorney—Dirk J. Veneman, Bruce L. Samlan and Gerald A. Mathews

[57] ABSTRACT

A valve for accurately controlling the quantity of plastic shot in an injection molding machine, said valve including a plunger slidably disposed through the center of a reciprocating screw, and a valve plug secured to the injection side of the plunger. The force of the plasticized material delivered by the rotatable screw opens the plug against an external force acting against the plunger. Upon stoppage of screw rotation, the external force seats the plug thereby accurately controlling the shot quantity.

10 Claims, 3 Drawing Figures

3,739,958

NON-RETURN VALVE FOR INJECTION MOLDING MACHINE

BACKGROUND OF THE INVENTION

The following relates to injection molding machines and more specifically to an improved non-return valve used therein.

Since the advent of the reciprocal screw, as taught in Willert U.S. Pat. No. 2,734,226, injection molding machines have delivered a relatively uniform and homogeneous mass of plastic to the mold. One problem still plaguing the industry, however, is that the non-return valve used at the injection end of the reciprocable screw is unable to accurately control the quantity of plastic shot injected into the mold. This has caused most injection molding machines to have a cushion or a reserve shot quantity to compensate for the failure of the non-return valve. The results in packing of the mold, causing strain in the molded article.

More specifically, the non-return valve commonly used, includes a check ring retainer having a blunt edge screwed into the reciprocating screw. The retainer traps a floating check ring between the retainer head and the injection end of the screw. As the screw rotates, plasticized material pushes the check ring forward allowing the material to flow through apertures in the retainer head to fill the plastic material receiving cavity in front of the screw, the filling of the receiving cavity slowly pushing the screw backwards.

Upon reaching a predetermined position which corresponds to the amount of shot to be delivered to the mold, a limit switch is activated and the screw stops rotating. A signal is sent and the screw moves forward to inject the plasticized material in the receiving cavity into the mold. During the initial forward injection motion, the material in the receiving cavity starts to feedback through the check ring. The feedback continues until the screw is moved sufficiently forward to force the check ring to move backward and block the injection end of the reciprocating screw, to prevent plastic from feeding back into the annular groove of the screw.

What would be desired then, is a non-return valve which could more accurately control the quantity of shot in an injection molding machine and thereby also improve the repeatability of consistent shots. It would further be desireable to eliminate packing of the mold and minimize strain in the molded article.

SUMMARY OF THE INVENTION

This disclosure relates to a non-return valve for an injection molding machine. The valve includes a plunger slidably disposed through the center of a reciprocating screw, the plunger having a valve plug secured to the injection side thereof. The plug provides fluid communication between a continuous annular groove of the screw and an expandible plastic material receiving space on the injection side of the screw. The plug is maintained in an opened position by the force of the plastic material flowing therethrough from the screw. The plunger extends longitudinally outside of the machine and suitable means are secured thereto to bias the plunger in a closing direction. Upon stoppage of screw rotation, plastic material ceases to flow from the annular screw groove, and the external means forces the plug to seat, to thereby prevent feedback of the plastic material from the plastic material receiving space into the annular screw groove.

As can readily be seen, the seating of the plug portion of the plunger is controlled independently of the plastic injection motion. The independence of the injection motion and the plug seating motion substantially eliminates the feedback of plastic material as occurs on the commonly used non-return valve. The quantity of shot is much more accurately controlled and is repeatable. Furthermore, packing is eliminated and strains on the finished article are substantially reduced.

DESCRIPTION OF THE PREFERRED EMBODIMENT

Figure 1:
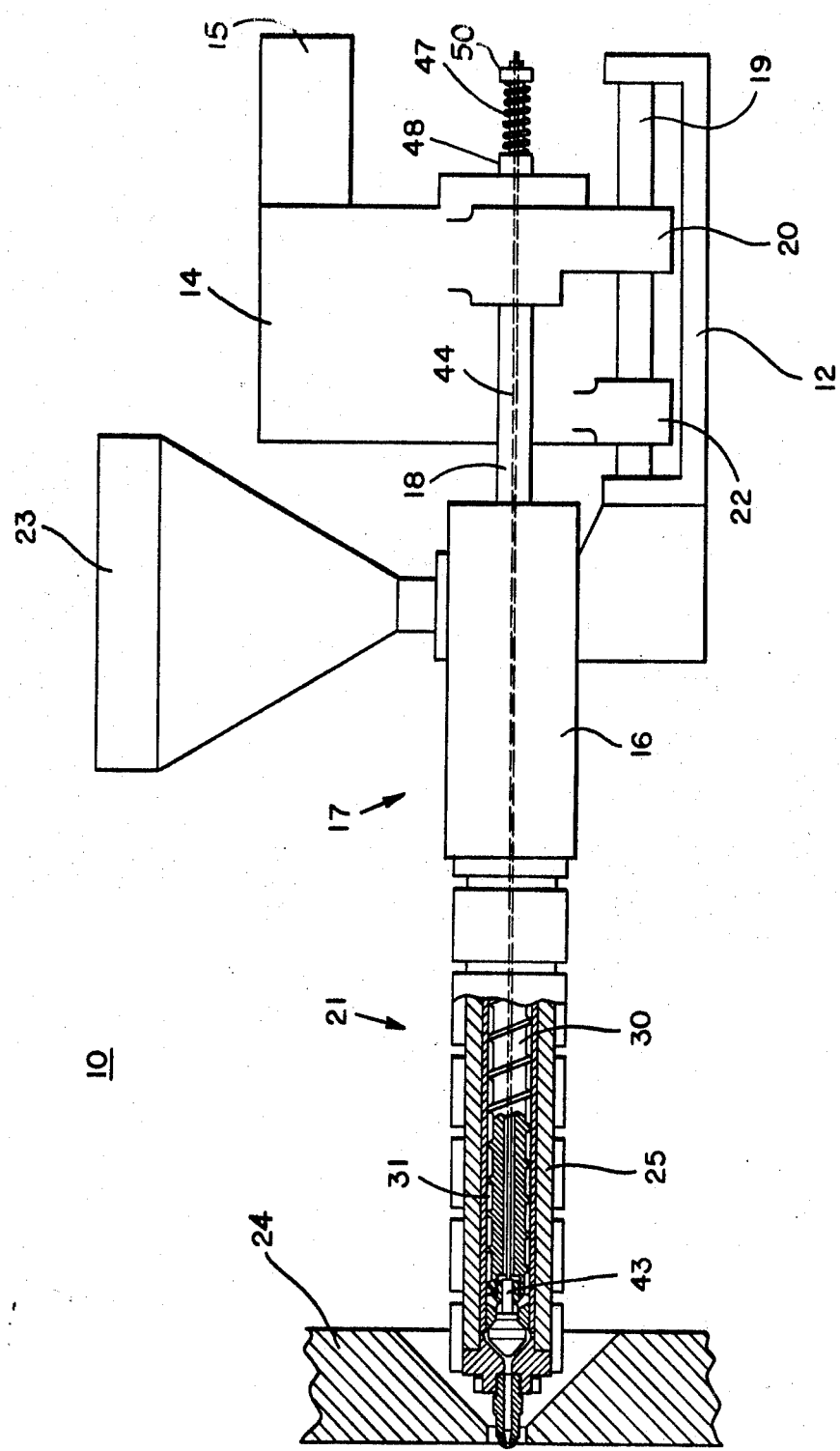
FIG. 1 is a side elevational view partly in section of an injection molding machine having a non-return valve built in accordance with the principles of the present invention.

Referring to the drawings and more specifically FIG. 1, there is shown the plasticizing and plastic delivering unit of an injection molding machine 10. The machine 10, as shown, is highly diagrammatic, and well known, and therefore need not be described in detail. Basically the machine 10 is comprised of a main base portion 12 and a rotatable drive unit 14, driven by hydraulic motor 15. A pair of hydraulic cylinders 16, are disposed on each side of the machine, one on each side. Only one cylinder 16 is shown. The cylinders 16 comprise the longitudinal or axial drive unit 17. The rotating drive unit 14, the hydraulic motor 15, and the axial drive unit 17 are supported on the base 12. The axial drive unit 17 is attached, in axial driving relation, to the rotatable drive unit 14 via piston rods 18 at the shoulder support 20, only one rod 18 and support 20 being shown. The rotatable drive unit 14 is slidably supported on a pair of tie-rods 19 through supports 20 and 22, only one of each being shown.

Reciprocating screw unit 21 is supported in a cantilevered manner by base 12, axial drive unit 17 and rotatable drive unit 14. The hopper structure 23 feeds plastic material to the reciprocating screw unit 21 in a manner well known in the art.

The reciprocating screw unit 21 delivers material to the mold structure, only a portion being shown as the fixed platen 24 and furthermore, plasticizes the material.

Figure 2:
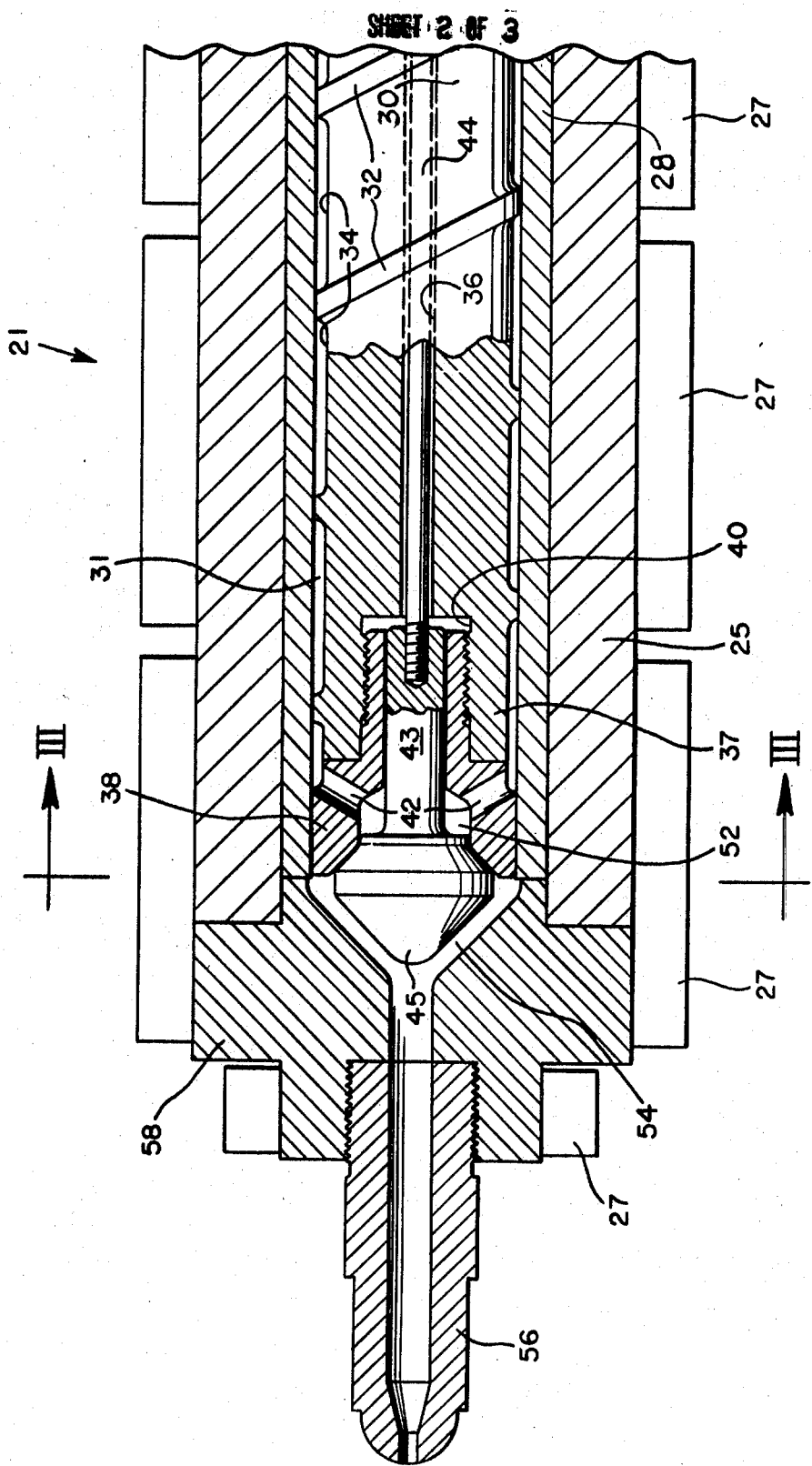
FIG. 2 is an axial sectional view of the non-return valve as shown in FIG. 1 on an enlarged scale.
Figure 3:
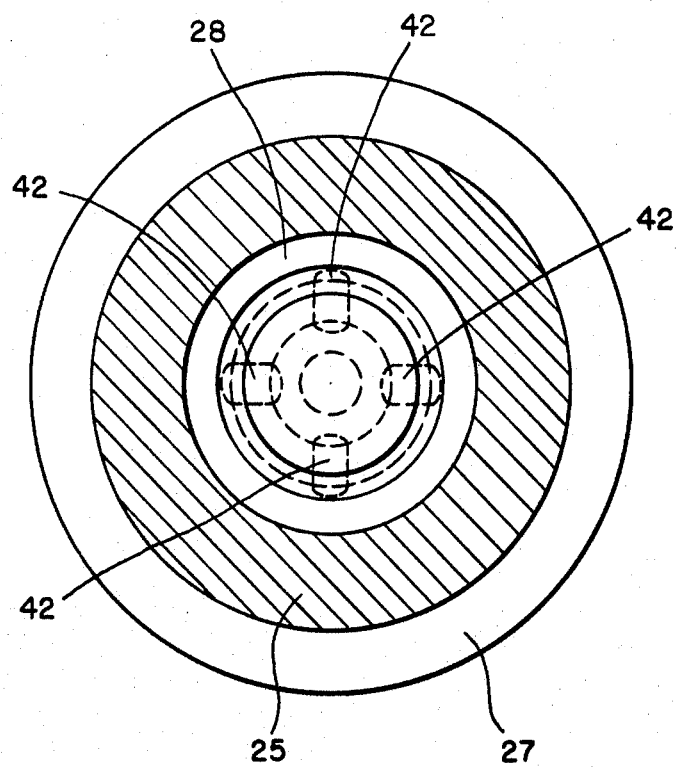
FIG. 3 is a view taken along line III-III in FIG. 2.

As best seen in FIGS. 2 and 3, the reciprocating screw unit 21 is comprised of a plastic material delivering cylinder or barrel 25. Encompassing the barrel 25, is a plurality of heater bands 27 which may be of the electrical resistance type. A cylindrical liner member 28 is secured to the inner diameter wall of the barrel 25. A reciprocating screw 30 is disposed within the liner, the screw being rotatable and axially reciprocable relative to the liner 28 and barrel 25. The screw 30 has a plurality of annular flat surfaces 34 between the liner and the screw body which are partially defined by threads or flights 32. The threads or screw flight 32 are in frictional abutment with the inner diameter of the liner 28. The flat surfaces 34 are in a radial spaced relation with the liner 24, thereby defining a continuous annular material delivering groove 31. The screw 30 has an axial central bore 36 extending the length of the screw. At the injection end 37 of the screw 30, a valve body portion 38 which is Y-shaped in cross section, is threaded into a corresponding groove 40 in the screw. The valve body portion 38 is actually a continuation of the screw 30 and defines the injection end of the material delivering groove 31.

A plurality of apertures 42 are provided in the injection side of the valve body portion 38. The apertures 42 (four being shown in FIG. 3) are inclined at an angle relative to the axial center line of the reciprocating screw 30. The apertures 42 provide fluid communication between the injection-most portion of the material delivering groove 31 and a central cavity 52, the cavity being defined by the annular wall of the injection side of the valve body 38. The valve body 38 rotates and reciprocates with the screw 30 relative to the cylindrical liner 28.

Disposed within the central bore 36 in the screw 30, is a plunger structure 43, being comprised of a draw rod 44, screw threaded into a valve plug 45, at its injection end. At its opposite end, the rod 44 (FIG. 1) extends beyond the drive unit 14 in an axial direction. A spring 47 encompasses the rod 44 and on one end is supported by an extened portion 48 of the rotatable drive unit 14, and, on the other end a large nut is screw threaded on the rod 44 to form a spring retainer 50. Therefore, any forward axial movement of the plunger relative to the drive 14 places the spring 47 into compression and biases the plunger in a rearward axial direction.

The valve plug 45 is contoured to cooperatively seat on the valve body 38. The valve body 38 and the valve plug 45 cooperatively define an annular cavity 52 which is in constant fluid communication with the material delivering groove 31. Plasticized material from the groove 31 enters the cavity 52 through the apertures 42. On the injection side of the valve plug 45, is a plastic material receiving reservoir 54 which is defined by a barrel cover 58 secured to the barrel 25, the valve body 38 and the plunger 45. The receiving reservoir 54 is in fluid communication with the mold via an injection valve 56. The injection nozzle 56 is screw threaded into the barrel end-cap 58.

In operation, plastic material is fed into the hopper 23. The plastic material then enters the material delivery groove 31 of the barrel 25. At this instant, the reciprocating screw unit 21 is in a position to the extreme left. Slow rotation of the screw 30 by the rotating drive unit 14 is begun and the plastic material is converted to a molten form by shear heat from the screw and the heaters 27. As the plasticized material reaches the injection end of the groove 31 of the screw 30, it flows through apertures 42 to slowly fill the annular cavity 52. Upon filling of the cavity 52, the force of the material pushes the plunger 43 in an axial direction to unseat the plunger from the valve body portion against the spring force 38. The material slowly fills the plastic material receiving reservoir 54, which expands, and is adjusted to substantially equal the volume of the mold employed. The injection nozzle 56 is already filled from the preceding shot and at the forward tip thereof, there may be a sprue so that passage of the plasticized material through the injection nozzle is prevented.

As the material begins to fill the receiving reservoir 54, the screw is slowly forced in a backward axial direction. When the screw 30 reaches a predetermined axial position to accurately meter the shot needed for injection of the specific mold, any suitable device such as a limit switch, is closed. The screw rotation is then stopped and the spring 47 which is in compression, closes the plunger 43 to seat the plug 45.

The seating of the plug 45 before the injection axial movement of the screw 30 ensures an extremely accurate and repeatable shot with almost no feedback. The mold 23 then opens to eject the finished plastic article therein. The mold is then closed and the axial drive unit 17 causes the drive unit 14 and the screw attached thereto to move in a forward axial direction to inject the mold with the plasticized material in the receiving reservoir 54 through the injection nozzle 56. This cycle is then repeated again.

The accuracy of the non-return valve enables an injection molding machine to have repeatable shot control, to mold without a cushion as is commonly done in the art, and furthermore, to mold with less strain in the finished plastic article. Less strain is produced in the plastic because the mold does not have to be packed and the injection force does not have to be increased to ensure a full pack in the mold.

What is claimed is:

1. A valve for an injection molding machine, said machine comprising a plastic delivering cylinder having an axially extending passageway therein, reciprocal and rotatable feeding means for plasticizing and feeding plastic material towards the injection end of said cylinder, means to supply plastic material from a material delivery groove of said feeding means at a point spaced from the injection end of said feeding means, said valve disposed at the injection end of said feeding means, said valve comprising:

a bore extending axially through at least a portion of said (screw) feeding means;

a plunger slidably disposed in said bore having a valve plug secured to the injection side thereof:

said plug cooperating with said feeding means and providing fluid communication between said material delivery groove and the injection end of said machine during the operation of said feeding means; and means to close said plug upon stoppage of rotation of said feeding means, to prevent feedback of the plastic material from the injection end of said machine into said material delivery groove.

2. The structure recited in claim 1 wherein the feeding means comprises a screw.

3. The valve recited in claim 2 and further including a valve body secured to the injection end of the screw, said valve body disposed between the injection end of the screw and the plug, and said valve body providing a seating surface for the plug.

4. The structure recited in claim 3 and further including means to direct a plasticized material from the material delivery groove to the valve plug.

5. A valve for an injection molding machine, said machine comprising a plastic delivering cylinder having an axially extending passageway therein, feeding means for feeding plastic material towards the injection end of said cylinder, means to supply plastic material from a material delivery groove of said feeding means at a point spaced from the injection end of said feeding means, said valve disposed at the injection end of said feeding means, said valve comprising:

a bore extending axially through at least a portion of said feeding means;

a plunger slidably disposed in said bore having a valve plug secured to the injection side thereof;

said plug cooperating with said feeding means to provide fluid communication between said material delivery groove and the injection end of said machine during the operation of said feeding means;

means to close said plug upon stoppage of said feeding means;

said feeding means comprising a rotatable and reciprocal screw;

a valve body secured to the injection end of the screw;

said valve body disposed between the injection end of the screw and the plug, and said valve body providing a seating surface for the plug;

said valve body having an axially extending portion at the injection end defining a annular cavity, and a smaller diameter portion extending axially on the opposite end, said valve body having a central bore disposed therethrough, the plunger being disposed through the central bore in said valve body into the bore in the screw, and a plurality of apertures disposed through the valve body to provide fluid communication between the material delivery groove and the annular cavity.

6. The structure recited in claim 5 and further including a plastic material receiving reservoir on the injection side of the valve plug, said valve plug regulating the flow of plasticized material from the annular cavity to said reservoir.

7. The structure recited in claim 1 wherein the plunger closing means is disposed external to the injection molding machine.

8. The structure recited in claim 2 wherein the plunger closing means comprises a spring structure, said spring structure being trapped between a spring retainer on one end of the plunger and means to rotate the screw.

9. A non-return valve for an injection molding machine, said machine comprising a plastic (delivering) delivery cylinder having an axially extending passageway therein, a rotatable and reciprocal screw for plasticizing and feeding plastic material towards the injection end of said screw, means for supplying plastic material from a material delivery groove of said screw at a point spaced from the injection end of said screw, said valve disposed at the injection end of said screw, said valve comprising:

a bore extending axially through said screw:

a plunger slidably disposed in said bore having a valve plug secured to the injection side thereof;

said plug cooperating with said screw and providing fluid communication between said material delivery groove and the injection end of said machine upon rotation of said screw;

a valve body secured to and disposed between the injection end of said screw and said plug to provide a seating surface for said plug;

means to direct a plasticized material from said material delivery groove to said valve plug;

means to close said plug upon stoppage of said screw (notation) rotation;

said closing means being disposed external to said injection molding machine.

10. A non-return valve for an injection molding machine, said machine comprising a plastic delivering cylinder having an axially extending passageway therein, a rotatable and reciprocal screw for feeding plastic material from a material delivery groove of said screw at a point spaced from the injection end of said screw, said valve disposed at the injection end of said screw, said valve comprising:

a bore extending axially through said screw;

a plunger slidably disposed in said bore having a valve plug secured to the injection side thereof;

said plug providing fluid communication between said material delivery groove and the injection end of said machine upon rotation of said screw;

a valve body disposed between the injection end of said screw and said plug to provide a seating surface for said plug;

means to direct a plasticized material from said material delivery groove to said valve plug;

means to close said plug upon stoppage of said screw rotation;

said closing means being disposed external to said injection molding machine, said valve body having an axially extending portion at the injection end defining an annular cavity, and a smaller diameter portion extending axially on the opposite end;

said valve body having a central bore disposed therethrough;

said plunger being disposed through the central bore in said valve body into the bore in the screw;

a plurality of apertures disposed through the valve body to provide fluid communication between the material delivery groove and said annular cavity;

a plastic material receiving reservoir on the injection side of the valve plug, said valve plug regulating the flow of plasticized material from said annular cavity to said reservoir.

a plastic material receiving reservoir on the injection side of the valve plug, said valve plug regulating the flow of plasticized material from said annular cavity to said reservoir.

* * * * *

PO-1050
(5/69)

UNITED STATES PATENT OFFICE
CERTIFICATE OF CORRECTION

Patent No. 3,739,958      Dated June 19, 1973

Inventor(s) Raymond A. York

It is certified that error appears in the above-identified patent and that said Letters Patent are hereby corrected as shown below:

Column 4, line 35, please delete "(screw)".

Column 5, line 42, please delete "(delivering)".

Column 6, line 9, please delete "(notation)".

Signed and sealed this 5th day of November 1974.

(SEAL)
Attest:

McCOY M. GIBSON JR.              C. MARSHALL DANN
Attesting Officer               Commissioner of Patents